United States Patent
Adams

(10) Patent No.: US 8,511,264 B2
(45) Date of Patent: Aug. 20, 2013

(54) FUEL SUPPLY AND COMBUSTION CHAMBER SYSTEMS FOR FASTENER-DRIVING TOOLS

(75) Inventor: Joseph S. Adams, Salt Spring Island (CA)

(73) Assignee: Illinois Tool Works Inc., Glenview, IL (US)

( * ) Notice: Subject to any disclaimer, the term of this patent is extended or adjusted under 35 U.S.C. 154(b) by 776 days.

(21) Appl. No.: 12/084,963

(22) PCT Filed: Oct. 6, 2006

(86) PCT No.: PCT/US2006/038996
§ 371 (c)(1),
(2), (4) Date: Mar. 4, 2009

(87) PCT Pub. No.: WO2007/058712
PCT Pub. Date: May 24, 2007

(65) Prior Publication Data
US 2009/0159050 A1    Jun. 25, 2009

Related U.S. Application Data

(60) Provisional application No. 60/597,190, filed on Nov. 16, 2005.

(51) Int. Cl.
*F02B 71/00* (2006.01)

(52) U.S. Cl.
USPC ............. 123/46 SC; 123/46 R; 123/46 E; 123/46 H; 123/446; 123/527

(58) Field of Classification Search
USPC ................. 123/46 R, 46 H, 46 SC, 446, 495, 123/527, 557
See application file for complete search history.

(56) References Cited

U.S. PATENT DOCUMENTS

| | | | | |
|---|---|---|---|---|
| 2,435,232 A | * | 2/1948 | Morain | 123/46 R |
| 3,092,958 A | * | 6/1963 | Duncan | 417/316 |
| 3,352,545 A | | 11/1967 | Denine | |
| 3,722,481 A | * | 3/1973 | Braun | 123/46 R |
| 4,013,396 A | | 3/1977 | Tenney | |
| 4,088,104 A | * | 5/1978 | Ibbott | 48/189.4 |
| 4,094,275 A | | 6/1978 | Auiler et al. | |
| 4,152,121 A | | 5/1979 | Van der Weide et al. | |
| 4,399,079 A | | 8/1983 | Lowe | |
| 4,773,361 A | | 9/1988 | Toki et al. | |
| 4,821,683 A | | 4/1989 | Veldman | |

(Continued)

FOREIGN PATENT DOCUMENTS

| | | |
|---|---|---|
| CN | 2374653 | 3/2000 |
| CN | 2469196 | 1/2002 |

(Continued)

*Primary Examiner* — Noah Kamen
*Assistant Examiner* — Grant Moubry
(74) *Attorney, Agent, or Firm* — Law Offices of Steven W. Weinrieb

(57) ABSTRACT

A fuel supply and combustion chamber system for a portable power tool, such as, for example, a fastener-driving tool, wherein the fuel supply and combustion chamber system can utilize liquid fuels. The fuel supply and combustion chamber system can comprise multiple combustion chambers for achieving predetermined combustion and power output characteristics. In addition, the fuel supply and combustion chamber system can utilize portioning valve structures for providing predetermined amounts of either a gaseous or liquid fuel into the portable power tool combustion chamber.

12 Claims, 3 Drawing Sheets

(56) References Cited

U.S. PATENT DOCUMENTS

| | | | |
|---|---|---|---|
| 4,905,634 A | 3/1990 | Veldman | |
| 4,997,598 A | 3/1991 | Aleem-Uddin | |
| 5,000,128 A * | 3/1991 | Veldman | 123/46 SC |
| 5,213,247 A | 5/1993 | Gschwend et al. | |
| 5,701,855 A | 12/1997 | Kurihara et al. | |
| 5,826,428 A | 10/1998 | Blaschke | |
| 6,189,516 B1 * | 2/2001 | Hei Ma | 123/524 |
| 6,526,926 B1 | 3/2003 | Towfighi | |
| 6,634,325 B1 * | 10/2003 | Adams | 123/46 R |
| 6,647,969 B1 | 11/2003 | Adams | |
| 6,805,105 B2 | 10/2004 | Kato et al. | |
| 6,843,401 B2 * | 1/2005 | Favre-Bulle | 227/10 |
| 6,912,988 B2 | 7/2005 | Adams | |
| 6,988,469 B2 * | 1/2006 | Schiestl et al. | 123/46 SC |
| 7,281,502 B2 | 10/2007 | Hurlstone et al. | |
| 7,798,383 B2 | 9/2010 | Liesse | |
| 2001/0020453 A1 * | 9/2001 | Bailey | 123/46 SC |
| 2001/0032601 A1 | 10/2001 | Galka et al. | |
| 2003/0177768 A1 | 9/2003 | Pellizzari | |
| 2004/0065277 A1 * | 4/2004 | Schaeffer | 123/46 SC |
| 2004/0079302 A1 | 4/2004 | Wolf et al. | |
| 2004/0112309 A1 * | 6/2004 | Odoni et al. | 123/46 SC |
| 2004/0187810 A1 * | 9/2004 | Gschwend et al. | 123/46 H |
| 2005/0120983 A1 * | 6/2005 | Adams | 123/46 R |

FOREIGN PATENT DOCUMENTS

| | | |
|---|---|---|
| JP | 60-120114 | 6/1985 |
| JP | 62-44170 | 9/1987 |
| JP | 63-207569 | 8/1988 |
| JP | 4-261783 | 9/1992 |
| JP | 08-338595 | 12/1996 |
| JP | 2001-162561 | 6/2001 |
| JP | 2004-34288 | 2/2004 |
| WO | WO 03/033058 | 4/2003 |

* cited by examiner

FUEL SUPPLY AND COMBUSTION CHAMBER SYSTEMS FOR FASTENER-DRIVING TOOLS

CROSS REFERENCE TO RELATED PATENT APPLICATIONS

This patent application is related to, and based upon, U.S. Provisional Patent Application Ser. No. 60/597,190 which was filed on Nov. 16, 2005.

FIELD OF THE INVENTION

The present invention relates generally to portable power tools, and more particularly to new and improved fuel supply and combustion chamber systems for such portable power tools, such as, for example, fastener-driving tools.

BACKGROUND OF THE INVENTION

Portable power tools having various different means for conducting or charging a combustible fuel into a suitable combustion chamber are of course well-known. An example of such a portable power tool is disclosed within U.S. Pat. No. 4,905,634 which issued to Veldman on Mar. 6, 1990. In accordance with the particular structure comprising the portable power tool of Veldman, the portable power tool disclosed therein utilizes any one of various gaseous fuels, such as, for example, compressed natural gas, a liquid petroleum gas, butane, or the like, and in order to effectively predetermine the rate at which the gaseous fuel is supplied to the power tool combustion chamber, a manually controlled adjusting screw or metering valve is utilized for the fine adjustment of the incoming gas supply. In addition, the introduction of the incoming gaseous fuel, as determined by means of the aforenoted manually controlled adjusting screw or metering valve, is also utilized to effectively induce or entrain the flow of ambient air into the combustion chamber of the power tool either for scavenging purposes in connection with residual gases that will be present within the combustion chamber upon completion of a particular power tool firing cycle, or for charging purposes in connection with the initiation of a subsequent power tool firing cycle. While the portable power tools, as exemplified by means of the portable power tool disclosed within the Veldman patent, are generally satisfactory, it is noted that such portable power tools nevertheless do exhibit some operational drawbacks or limitations.

For example, as has been noted hereinbefore, such portable power tools are adapted for use in connection with gaseous fuels, not liquid fuels, however, it is often desirable to operate such portable power tools, or similar portable power tools, with liquid fuels. In addition, while the aforenoted manually controlled adjusting screw or metering valve can predetermine the rate at which the gaseous fuel is supplied to the power tool combustion chamber, it is important that a predetermined amount of the fuel be supplied into the power tool combustion chamber so as to achieve proper or more accurate stoichiometric air-fuel ratios. Still yet further, portable power tools such as those disclosed within Veldman are not concerned with multiple combustion chamber systems which are desired or required for achieving predetermined combustion and power output characteristics or parameters.

A need therefore exists in the art for a new and improved fuel supply and combustion chamber system for a portable power tool, such as, for example, a fastener-driving tool, wherein the fuel supply and combustion chamber system can utilize liquid fuels, wherein the fuel supply and combustion chamber system can comprise multiple combustion chamber systems for achieving predetermined combustion and power out-put characteristics or parameters, and wherein the fuel supply and combustion chamber system can utilize portioning valve structures for providing predetermined amounts of either a gaseous or liquid fuel into the portable power tool combustion chamber.

SUMMARY OF THE INVENTION

The foregoing and other objectives are achieved in accordance with the teachings and principles of the present invention through the provision of a first embodiment of a new and improved fuel supply and combustion chamber system for a portable power tool which comprises the use of, for example, a liquefied liquid petroleum gas fuel supply as the portable power tool fuel source, and an evaporator which may be, for example, incorporated within the handle or housing structure of the power tool so as to effectively be in thermal communication with a suitable heat source whereby the heat source can serve to cause the evaporation of the liquefied liquid petroleum gas thereby converting the same into a gaseous fuel. The suitable heat source may either be, for example, the ambient environment, or heat generated by and transmitted from the power tool combustion chamber. A portioning valve is preferably interposed between and operatively associated with both the liquefied liquid petroleum gas fuel supply and the evaporator so as to supply a predetermined amount or portion of the liquefied liquid petroleum gas from the liquefied liquid petroleum gas fuel supply to the evaporator.

In accordance with additional principles and teachings of the present invention, there is provided a second embodiment of a new and improved fuel supply and combustion chamber system for a portable power tool which comprises the use of multiple combustion chambers for achieving predetermined combustion and power output characteristics or parameters, wherein the same comprises, for example, a first pre-combustion chamber and a second main combustion chamber, a bypass valve interposed between and fluidically connecting the first and second combustion chambers together under exhaust gas scavenging or purging conditions, and a jet pump disposed upstream of the first pre-combustion chamber for admitting a predetermined charge or amount of fuel into the first pre-combustion chamber and for inducing or entraining air into the predetermined charge or amount of fuel for mixing therewith in order to form an air-fuel mixture having a predetermined stoichiometric ratio.

Lastly, in accordance with still additional principles and teachings of the present invention, there is provided a third embodiment of a new and improved fuel supply and combustion chamber system for a portable power tool which comprises the use of a gaseous liquid petroleum gas fuel supply as the portable power tool fuel source, and a portioning valve interposed between the gaseous liquid petroleum gas fuel supply and a jet pump disposed upstream of the portable power tool combustion chamber. In this manner, a predetermined amount or portion of the gaseous liquid petroleum gas fuel is supplied from the gaseous liquid petroleum gas fuel supply to the jet pump and into the combustion chamber of the power tool. Alternatively, a metering valve may be utilized for supplying the gaseous liquid petroleum gas fuel toward the jet pump and the combustion chamber of the power tool, and an electrically timed pulse supply controller is operatively associated with the metering valve for effectively converting the same from a metering valve, for determining the flow rate of the fuel passing therethrough, to a portioning valve for determining the amount of the fuel passing therethrough.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
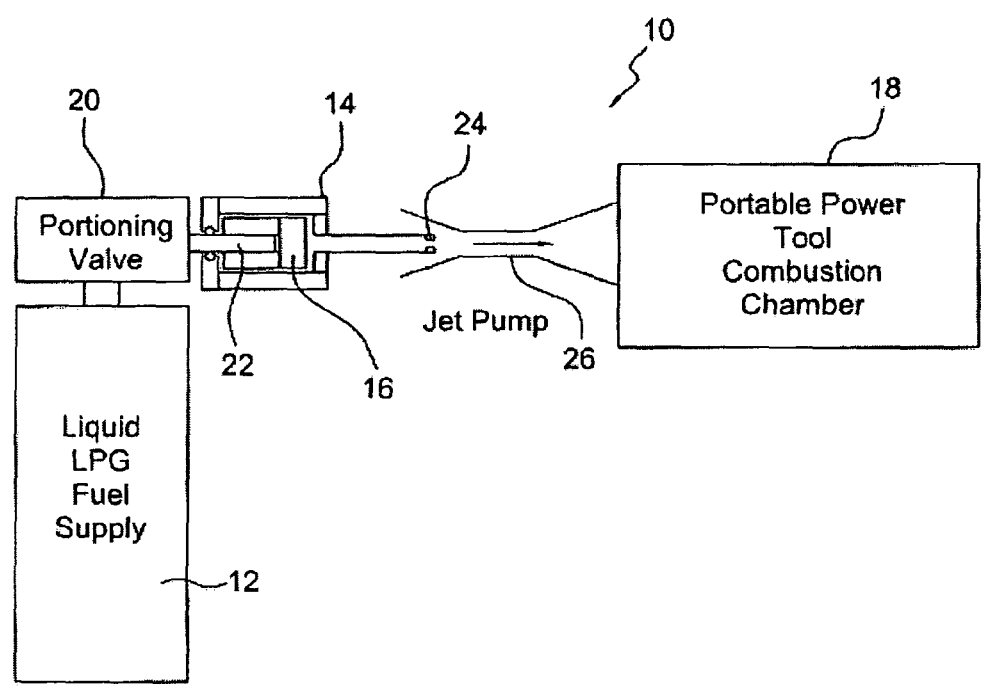
FIG. 1 is a schematic drawing illustrating a first embodiment of a new and improved fuel supply and combustion chamber system for a portable power tool, constructed in accordance with the principles and teachings of the present invention, wherein the same comprises the use of, for example, a liquefied liquid petroleum gas fuel supply as the portable power tool fuel source, an evaporator for evaporating the liquefied liquid petroleum gas and thereby converting the same into a gaseous fuel for admission into the combustion chamber of the portable power tool, and a portioning valve interposed between and operatively associated with the liquefied liquid petroleum gas fuel supply and the evaporator so as to supply a predetermined amount or portion of the liquefied liquid petroleum gas from the liquefied liquid petroleum gas fuel supply to the evaporator.

Referring now to the drawings, and more particularly to FIG. 1 thereof, a first embodiment of a new and improved fuel supply and combustion chamber system, for a portable power tool, as constructed in accordance with the principles and teachings of the present invention, is disclosed and is generally indicated by the reference character 10. More particularly, it is seen that the first embodiment new and improved fuel supply and combustion chamber system 10 for a portable power tool comprises a liquefied liquid petroleum gas fuel supply 12 as the fuel source for the portable power tool, and an evaporator 14, comprising a sintered bronze element 16, for effectively evaporating the liquefied liquid petroleum gas fuel and thereby converting the same into a gaseous liquid petroleum gas fuel for admission into the combustion chamber 18 of the portable power tool. In addition, a portioning valve 20 is interposed between, and is operatively and fluidically connected with, both the liquefied liquid petroleum gas fuel supply 12 and the evaporator 14. In this manner, the portioning valve 20 receives liquefied liquid petroleum gas from the liquefied liquid petroleum gas fuel supply 12, and when the nozzle portion 22 of the portioning valve 18 is moved relative to the evaporator 14, a predetermined portion or amount of the liquefied liquid petroleum gas fuel is discharged toward and into or onto the sintered bronze element 16 of the evaporator 14.

The evaporator 14 is adapted to be disposed or incorporated within, for example, the handle portion or other structural component of the portable power tool housing so as to effectively be disposed in thermal communication either with the ambient environment or the combustion chamber 18 of the portable power tool so as to effectively evaporate the predetermined portion of the liquefied liquid petroleum gas fuel dispensed from the portioning valve 20. Accordingly, when the evaporator 14 achieves the aforenoted evaporation of the liquefied liquid petroleum gas fuel and effectively converts the same into a gaseous liquid petroleum gas fuel, the gaseous liquid petroleum gas fuel will, in turn, be dispensed from the discharge orifice 24 of the evaporator 14 into a jet pump mechanism 26 which is interposed between the evaporator 14 and the combustion chamber 18 of the portable power tool. The jet pump mechanism 26 comprises, in effect, a venture-type device that effectively induces or entrains air into the gaseous liquid petroleum gas fuel being dispensed or discharged by means of the evaporator 14 toward the combustion chamber 18 of the portable power tool so as to permit the induced or entrained air to mix with the aforenoted gaseous liquid petroleum gas fuel being conducted or conveyed into the combustion chamber 18 of the portable power tool. As a result of the aforenoted structure characteristic of the first embodiment new and improved fuel supply and combustion chamber system 10 for a portable power tool, the portable power tool may be operated with liquid fuel, and in addition, the employment of the portioning valve 20 within the system 10 permits a predetermined amount of the fuel be supplied into the portable power tool combustion chamber 18 so as to achieve a proper or more accurate stoichiometric air-fuel mixture ratio.

Figure 2A:
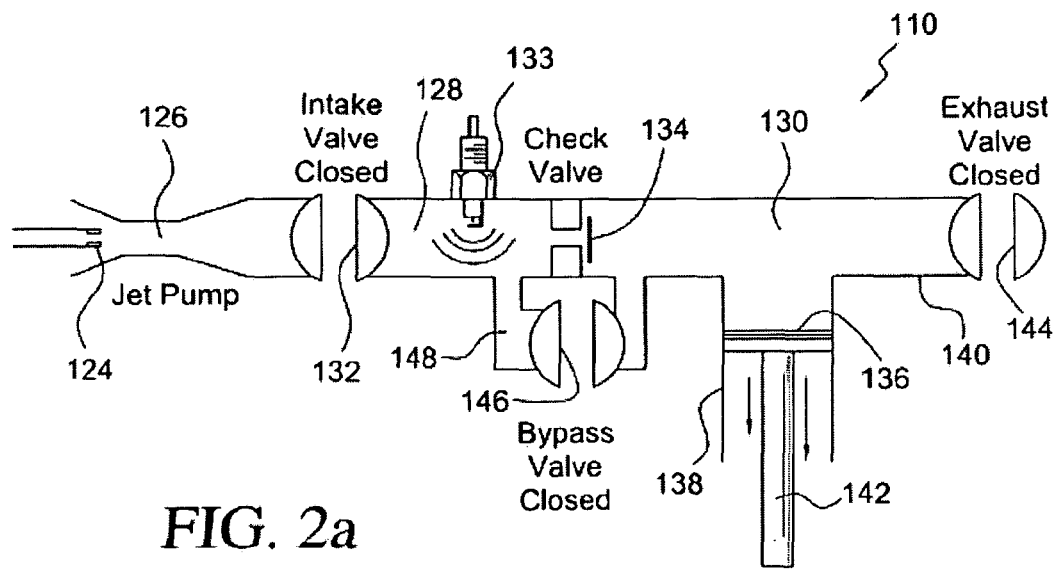
FIGS. 2*a* and 2*b* are schematic views illustrating a second embodiment of a new and improved fuel supply and combustion chamber system for a portable power tool, as constructed in accordance with the principles and teachings of the present invention, wherein the same comprises the use of multiple combustion chambers comprising, for example, a first pre-combustion chamber and a second main combustion chamber, a bypass valve interposed between and fluidically connecting the first and second combustion chambers together under exhaust gas scavenging or purging conditions, as illustrated within FIG. 2*b*, and a jet pump disposed upstream of the first pre-combustion chamber for admitting a predetermined charge or amount of fuel into the first pre-combustion chamber and for inducing or entraining air into the predetermined charge or amount of fuel for mixing therewith in order to form an air-fuel mixture having a predetermined stoichiometric ratio.
Figure 2B:
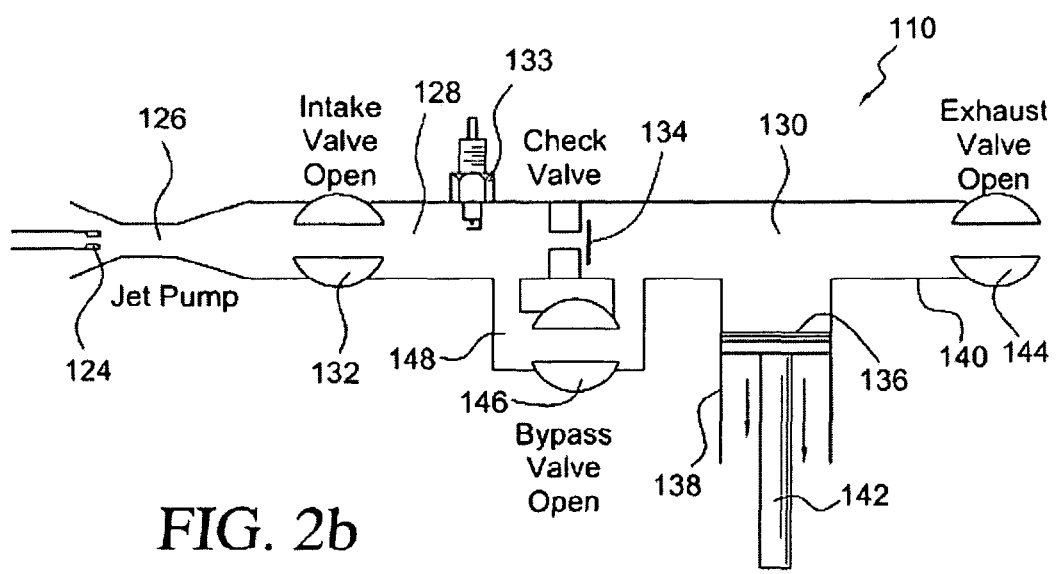

With reference now being made to FIGS. 2*a* and 2*b*, a second embodiment of a new and improved fuel supply and combustion chamber system for a portable power tool, as constructed in accordance with the principles and teachings of the present invention, is disclosed and is generally indicated by the reference character 110. It is to be noted that, in connection with the detailed description of the second embodiment fuel supply and combustion chamber system 110 for a portable power tool, the description will focus upon the particular structure characteristic of such second embodiment fuel supply and combustion chamber system 110, however, structural components of such second embodiment fuel supply and combustion chamber system 110, which are similar or correspond to structural components of the first embodiment fuel supply and combustion chamber system 10 as disclosed within FIG. 1, will be designated by similar or corresponding reference characters except that they will be within the 100 series. More particularly, it is seen that, in accordance with the principles and teachings of the present invention, the second embodiment fuel supply and combustion chamber system 110 comprises the use of multiple combustion chambers so as to achieve predetermined combustion and power output characteristics or parameters. Accordingly, it is seen that the second embodiment fuel supply and combustion chamber system 110 comprises a first pre-combustion chamber 128 and a second main combustion chamber 130.

A jet pump 126, which receives gaseous liquid petroleum gas fuel from a discharge orifice 124 and which also induces or entrains air for mixing with the gaseous liquid petroleum gas fuel and for forming an air-fuel mixture having a predetermined stoichiometric mixture ratio, is adapted to be fluidically connected to the upstream end portion of the first pre-combustion chamber 128 through means of a first, two-position intake valve mechanism 132. An ignition device, such as, for example, a spark plug 133, is disposed within the first pre-combustion chamber 128 for igniting the air-fuel mixture, and it is seen that a check valve mechanism 134 is interposed between, and fluidically interconnects, the first and second pre-combustion and main combustion chambers 128,130 during an ignition, firing, and combustion operational cycle of the portable power tool as illustrated within FIG. 2a. A working piston 136 is movably disposed within a working cylinder 138 which is fluidically connected to the second main combustion chamber 130 through means of a side wall portion 140 thereof, and when the portable power tool comprises, for example, a fastener-driving tool, a driver blade 142 or similar fastener-driving member is fixedly connected to the working piston 136. Still further, it is also seen that the downstream end portion of the second main combustion chamber 130 is provided with a second two-position exhaust valve 144, and in accordance with still additional principles and teachings of the present invention, a third two-position bypass valve 146 is disposed within a bypass passageway 148 so as to be interposed between, and fluidically interconnect, the first and second pre-combustion and main combustion chambers 128,130 during an exhaust gas scavenging or purging operational cycle of the portable power tool as illustrated within FIG. 2b.

More particularly, in connection with the operation of the second embodiment fuel supply and combustion chamber system 110 for a portable power tool, when an ignition, firing, and combustion operational cycle of the portable power tool is to be initiated, the first intake valve 132, the second exhaust valve 144, and the third bypass valve 146 are initially disposed at their OPEN positions, as illustrated within FIG. 2b, so as to admit or charge a predetermined stoichiometric air-fuel mixture into the pre-combustion and main combustion chambers 128,130 from the jet pump 126, and subsequently, the first intake valve 132, the second exhaust valve 144, and the third bypass valve 146 are simultaneously moved to their CLOSED positions, as illustrated within FIG. 2a, in order to effectively entrap the air-fuel mixture within the pre-combustion and main combustion chambers 128,130. Subsequently, still further, ignition of the air-fuel mixture within the first primary combustion chamber 128 is initiated by means of the spark plug 133, and as a result of the consequent buildup in pressure within the first pre-combustion chamber 128, the check valve mechanism 134 is forced toward its OPEN position whereby the main or primary combustion of the air-fuel mixture will now occur within the second main combustion chamber 130, so as to operatively drive the working piston 136, in accordance with well-known principles as are more fully set forth, for example, within U.S. Pat. No. 6,912,988 which issued to Adams on Jul. 5, 2005, the disclosure of which is hereby incorporated herein by reference. Upon completion of the power tool firing cycle, it is desirable to scavenge or purge the exhaust gases present within the first and second pre-combustion and main combustion chambers 128,130 which would normally be achieved under relatively high pressure conditions in order to activate or force open the check valve mechanism 134, however, under such relatively low pressure conditions attendant the use of the jet pump 126, such an operational procedure is not available. Accordingly, the provision of the third bypass valve 146 resolves this problem, and therefore, when the exhaust gas scavenging or purging operation is to be performed, the first intake valve 132, the second exhaust valve 144, and the third bypass valve 146 are simultaneously moved back to their OPEN positions as illustrated within FIG. 2b, and as a result of an air-fuel mixture again being charged into the first pre-combustion chamber 128 from the jet pump 126, the air-fuel mixture will flow through the first intake valve 132, through the pre-combustion chamber 128, through the bypass passageway 148 and the bypass valve 146, through the second main combustion chamber 132, and outwardly through the second exhaust valve 144, thereby entraining and exhausting the residual exhaust gases or products disposed within the first pre-combustion and second main combustion chambers 128,130.

Figure 3A:
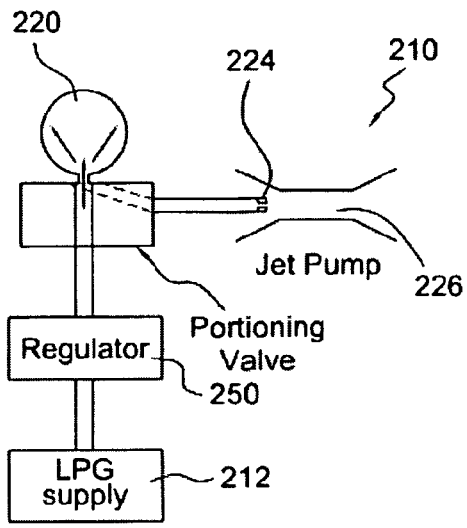
FIGS. 3*a* and 3*b* are schematic views illustrating a third embodiment of a new and improved fuel supply and combustion chamber system for a portable power tool, as has been constructed in accordance with the principles and teachings of the present invention, wherein the same comprises the use of a gaseous liquid petroleum gas fuel supply as the portable power tool fuel source, and a portioning valve which is interposed between the gaseous liquid petroleum gas fuel supply and a jet pump disposed upstream of the portable power tool combustion chamber, and which is movable between two alternative positions, as respectively illustrated within FIGS. 3*a* and 3*b*, such that a predetermined amount or portion of the gaseous liquid petroleum gas fuel may be supplied from the gaseous liquid petroleum gas fuel supply to the jet pump and into the combustion chamber of the power tool.
Figure 3B:
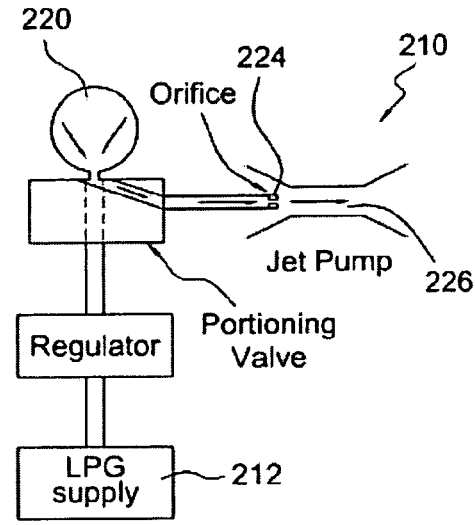

With reference now being made to FIGS. 3a and 3b, a third embodiment of a new and improved fuel supply and combustion chamber system for a portable power tool, as has been constructed in accordance with the principles and teachings of the present invention, is disclosed and is generally indicated by the reference character 210. As was the case with the second embodiment fuel supply and combustion chamber system 110 for a portable power tool, as disclosed within FIGS. 2a and 2b, it is likewise to be noted that, in connection with the detailed description of the third embodiment fuel supply and combustion chamber system 210 for a portable power tool, the description will focus upon the particular structure characteristic of such third embodiment fuel supply and combustion chamber system 210, however, structural components of such third embodiment fuel supply and combustion chamber system 210, which are similar or correspond to structural components of the first and second embodiment fuel supply and combustion chamber systems 10,110 as disclosed within FIGS. 1,2a,2b, will be designated by similar or corresponding reference characters except that they will be within the 200 series.

More particularly, it is seen that, in accordance with the principles and teachings of the present invention, the third embodiment fuel supply and combustion chamber system 210 comprises a gaseous liquid petroleum gas fuel supply 212 and a portioning valve 220 which may be operationally similar to the portioning valve 20 as disclosed in connection with the first embodiment fuel supply and combustion chamber system 10, as disclosed within FIG. 1, in that the same will provide a predetermined amount or portion of the gaseous liquid petroleum gas fuel toward a jet pump 226, however, it is seen that the portioning valve 220 is rotatably mounted between a first position, as illustrated at solid lines within FIG. 3a, and a second position as illustrated at solid lines within FIG. 3b. When the portioning valve 220 is therefore disposed at its first position as illustrated within FIG. 3a, the portioning valve 220 is disposed in fluidic communication with a suitable pressure regulator 250, which is operatively associated with the gaseous liquid petroleum gas fuel supply 212 so as to regulate the pressure of the gaseous liquid petroleum gas fuel being discharged from the gaseous liquid petroleum gas fuel supply 212, so as to receive a supply of the gaseous liquid petroleum gas fuel from the gaseous liquid petroleum gas fuel supply 212 at a predeterminedly desired pressure value, and when the portioning valve 220 is disposed at its second position as illustrated within FIG. 3b, the portioning valve 220 is disposed in fluidic communication with the dispensing or discharge orifice structure 224 so as to provide the predetermined amount or portion of the gaseous liquid petroleum gas fuel to the dispensing or discharge orifice 224 for conveyance and introduction into the jet pump 226 whereby such gaseous liquid petroleum gas fuel may, in turn, be conveyed into the combustion chamber of the portable power tool.

Figure 4:
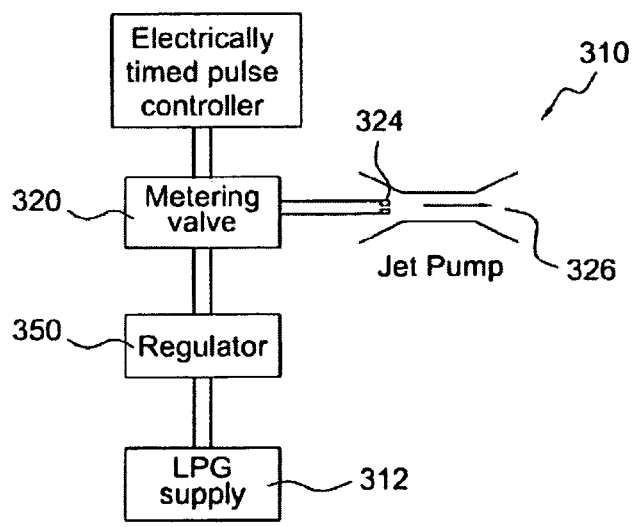
FIG. 4 is a schematic view illustrating, in effect, a modified or alternative embodiment with respect to the third embodiment of the new and improved fuel supply and combustion chamber system for the portable power tool as illustrated within FIGS. 3*a* and 3*b*, wherein a metering valve may be utilized for supplying the gaseous liquid petroleum gas fuel toward the jet pump and the combustion chamber of the power tool, and an electrically timed pulse supply controller is operatively associated with the metering valve for effectively converting the metering valve, which effectively determines the flow rate of the fuel passing therethrough, to a portioning valve which effectively determines the amount of the fuel passing therethrough.

With reference lastly being made to FIG. 4, a fourth embodiment of a new and improved fuel supply and combustion chamber system for a portable power tool, as has been constructed in accordance with the principles and teachings of the present invention, is disclosed and is generally indicated by the reference character 310. As was the case with the second and third embodiment fuel supply and combustion chamber system 110,210 for a portable power tool, as disclosed within FIGS. 2a,2b, and 3a,3b, it is likewise to be noted that, in connection with the detailed description of the fourth embodiment fuel supply and combustion chamber system 310 for a portable power tool, the description will focus upon the particular structure characteristic of such fourth embodiment fuel supply and combustion chamber system 310, however, structural components of such fourth embodiment fuel supply and combustion chamber system 310, which are similar or correspond to structural components of the first, second, and third embodiment fuel supply and combustion chamber systems 10,110,210 as disclosed within FIGS. 1,2a, 2b,3a,3b will be designated by similar or corresponding reference characters except that they will be within the 300 series.

More particularly, the fourth embodiment fuel supply and combustion chamber system 310 substantially comprises modified structure with respect to the second embodiment fuel supply and combustion chamber system 210 in that, in lieu of utilizing the portioning valve 220 in conjunction with the gaseous liquid petroleum gas fuel supply 212 and the pressure regulator 250, a metering valve 320 is utilized in conjunction with a gaseous liquid petroleum gas fuel supply 312 and a pressure regulator 350. It has been noted, however, that a metering valve is not as desirable for usage in conjunction with such combustion systems and power tools as is a portioning valve in that while a metering valve will control the rate at which a particular fuel is dispensed, a metering valve cannot provide a predetermined amount or volume of the dispensed fuel. Therefore, in accordance with the teachings and principles of the present invention, an electrically timed pulse controller 352 is operatively connected to the metering valve 320 so as to effectively convert the metering valve 320 into a portioning valve by controlling the opening and closing of the metering valve at predetermined times such that a predetermined amount or volume of the gaseous liquid petroleum gas fuel from the gaseous liquid petroleum gas fuel supply 312 will be dispensed from the dispensing or discharge orifice 324 toward and into the jet pump 326.

Thus, it may be seen that in accordance with the principles and teachings of the present invention, there has been provided a new and improved fuel supply and combustion chamber system for a portable power tool, such as, for example, a fastener-driving tool, wherein the fuel supply and combustion chamber system can utilize a liquid fuel and an evaporator in conjunction therewith. In addition, the fuel supply and combustion chamber system can comprise multiple combustion chamber systems, for achieving predetermined combustion and power output characteristics or parameters, in conjunction with an exhaust gas scavenging or purging bypass mechanism interposed between the first and second pre-combustion and main combustion chambers. Still further, the fuel supply and combustion chamber system can utilize portioning valve structures for providing predetermined volumes or amounts of either a gaseous or liquid fuel into the portable power tool combustion chamber.

Obviously, many variations and modifications of the present invention are possible in light of the above teachings. It is therefore to be understood that within the scope of the appended claims, the present invention may be practiced otherwise than as specifically described herein.

What is claimed and desired to be protected by letters patent of the United States of America, is:

1. A fuel supply and combustion chamber system for use within a power tool, comprising:
    a piston chamber within which a working piston is disposed;
    a combustion chamber;
    a liquid fuel supply containing a supply of liquid fuel;
    a valve, fluidically connected to said liquid fuel supply, for dispensing a predetermined amount of said liquid fuel from said liquid fuel supply;
    an evaporator, fluidically connected at a first end portion thereof to said valve, for converting said predetermined amount of said liquid fuel, dispensed by said valve, into a gaseous fuel, and fluidically connected at a second end portion thereof to said combustion chamber for supplying said gaseous fuel to said combustion chamber;
    a jet pump interposed between said evaporator and said combustion chamber for entraining air into said dispensed gaseous fuel so as to define an air-fuel mixture, having predetermined stoichiometric ratio, for introduction into said combustion chamber;
    a check valve operatively associated with said combustion chamber for fluidically connecting said combustion chamber to said piston chamber when a relatively high predetermined pressure level is attained within said combustion chamber during a combustion cycle; and
    a bypass valve interposed between said combustion chamber and said piston chamber for fluidically connecting said combustion chamber to said piston chamber, under relatively low pressure exhaust gas scavenging conditions, as a scavenging air-fuel mixture is introduced from said jet pump, into said combustion chamber, and into said piston chamber so as to scavenge combustion products out from said piston chamber.

2. The fuel supply and combustion chamber system as set forth in claim 1, wherein:
    said liquid fuel supply comprises a liquefied liquid petroleum gas fuel supply.

3. The fuel supply and combustion chamber system as set forth in claim 1, wherein:
said valve comprises a portioning valve.

4. The fuel supply and combustion chamber system as set forth in claim 1, wherein:
said evaporator comprises a sintered bronze element.

5. The fuel supply and combustion chamber system as set forth in claim 1, wherein:
said bypass valve comprises a two-position valve.

6. The fuel supply and combustion chamber system as set forth in claim 1, further comprising:
an intake value is disposed at an upstream end of said combustion chamber; and
an exhaust valve is disposed at a downstream end of said piston chamber.

7. The fuel supply and combustion chamber system as set forth in claim 6, wherein:
said intake and exhaust valves comprise two position valves.

8. A fuel supply and combustion chamber system for use within a power tool, comprising:
a piston chamber within which a working piston is disposed;
a combustion chamber;
a gaseous liquid fuel supply containing a supply of gaseous liquid fuel;
a valve, fluidically connected to said gaseous liquid fuel supply, for dispensing a predetermined amount of said gaseous liquid fuel from said liquid fuel supply;
a pressure regulator, interposed between said gaseous liquid fuel supply containing said supply of gaseous liquid fuel, and said valve, for regulating the pressure of said gaseous liquid fuel being discharged from said liquid fuel supply and for supplying said gaseous liquid fuel at a predetermined pressure value to said valve;
a jet pump interposed between said valve and said combustion chamber for entraining air into said dispensed gaseous liquid fuel so as to define an air-fuel mixture, having predetermined stoichiometric ratio, for introduction into said combustion chamber;
a check valve operatively associated with said combustion chamber for fluidically connecting said combustion chamber to said piston chamber when a relatively high predetermined pressure level is attained within said combustion chamber during a combustion cycle; and
a bypass valve interposed between said combustion chamber and said piston chamber for fluidically connecting said combustion chamber to the piston chamber, under relatively low pressure exhaust gas scavenging conditions, as a scavenging air-fuel mixture is introduced from said jet pump, into said combustion chamber, and into said piston chamber so as to scavenge combustion products out from said piston chamber.

9. The fuel supply and combustion chamber system as set forth in claim 8, wherein:
said valve comprises a portioning valve.

10. The fuel supply and combustion chamber system as set forth in claim 9, wherein:
said portioning valve comprises a two-position rotatable valve such that when said portioning valve is disposed at a first position, said portioning valve is in fluidic communication with said pressure regulator so as to receive said gaseous liquid fuel at said predetermined pressure value, whereas when said portioning valve is disposed at a second position, said portioning valve is in fluidic communication with said jet pump so as to supply said gaseous liquid fuel into said entrained air of said jet pump.

11. The fuel supply and combustion chamber system as set forth in claim 8, wherein:
said valve comprises a metering valve.

12. The fuel supply and combustion chamber system as set forth in claim 11, further comprising:
an electrically timed pulse controller is operatively connected to said metering valve so as to effectively convert said metering into a portioning valve.

\* \* \* \* \*